(12) United States Patent
Ito et al.

(10) Patent No.: US 6,470,089 B2
(45) Date of Patent: Oct. 22, 2002

(54) DATA RECORDING/REPRODUCING APPARATUS, DATA RECORDING/REPRODUCING METHOD APPLIED TO THE APPARATUS, AND COMPUTER PROGRAM PRODUCT USED IN DATA PROCESSING APPARATUS

(75) Inventors: Seigo Ito, Hanno; Yasuhiro Ishibashi; Fumitaka Sato, both of Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/905,112

(22) Filed: Jul. 16, 2001

(65) Prior Publication Data

US 2001/0038704 A1 Nov. 8, 2001

Related U.S. Application Data

(62) Division of application No. 09/189,844, filed on Nov. 12, 1998.

(30) Foreign Application Priority Data

Nov. 13, 1997 (JP) .............................................. 9-312344
Nov. 28, 1997 (JP) .............................................. 9-329207

(51) Int. Cl.[7] .............................................. G06K 9/00
(52) U.S. Cl. ...................................................... 382/100
(58) Field of Search .................................. 382/100, 309; 713/176, 179, 180, 181; 380/22, 51; 370/526, 527, 528, 529; 348/460; 704/231; 386/116, 124, 125; 717/7

(56) References Cited

U.S. PATENT DOCUMENTS

| 3,814,943 A | 6/1974 | Baker et al. ................. 250/550 |
| 4,297,729 A | 10/1981 | Steynor et al. ................ 360/40 |
| 5,265,082 A | * 11/1993 | Gniewek et al. ......... 369/53.45 |
| 5,453,968 A | * 9/1995 | Veldhuis et al. ......... 369/47.12 |

(List continued on next page.)

FOREIGN PATENT DOCUMENTS

| JP | 7-29180 | 1/1995 | ............ G11B/7/00 |
| JP | 9-259573 | 10/1997 | ........... G11B/27/00 |

*Primary Examiner*—Andrew W. Johns
*Assistant Examiner*—Shervin Nakhjavan
(74) *Attorney, Agent, or Firm*—Finnegan, Henderson, Farabow, Garrett & Dunner, L.L.P.

(57) ABSTRACT

In a data recording and reproducing apparatus which records and reproduces a record medium in which at least two kinds of data having different data types can be recorded, data is read out from the record medium, and a digital watermark is detected from the data read out. The kind of data is determined depending upon whether the digital watermark is detected, and it is determined whether retry processing at the time of reading-out the data and verifying processing at the time of writing should be executed. The retry processing or the verifying processing is executed only for the data which is determined that the retry processing or the verifying processing should be executed. Therefore, in the case of data whose reading-out continuity is more important than reliability, the retry processing is omitted, so that time required for reading-out processing can be shortened. In the case of data whose recording continuity is more important than reliability, the verifying processing is omitted, so that time required for writing processing can be shortened.

16 Claims, 7 Drawing Sheets

U.S. PATENT DOCUMENTS

| | | | |
|---|---|---|---|
| 5,623,470 A | | 4/1997 | Asthana et al. .......... 369/47.49 |
| 5,689,559 A | * | 11/1997 | Park ........................... 380/203 |
| 5,703,867 A | | 12/1997 | Miyauchi et al. ........ 369/59.11 |
| 5,719,937 A | * | 2/1998 | Warren et al. .............. 380/203 |
| 5,719,943 A | * | 2/1998 | Amada et al. .............. 380/202 |
| 5,724,327 A | * | 3/1998 | Timmermans et al. ... 369/47.24 |
| 5,777,955 A | * | 7/1998 | Ikeda et al. ............... 369/47.19 |
| 5,889,868 A | * | 3/1999 | Moskowitz et al. ........ 713/176 |
| 5,896,454 A | | 4/1999 | Cookson et al. .............. 360/60 |
| 5,933,498 A | | 8/1999 | Schneck et al. ............... 705/54 |
| 5,974,548 A | | 10/1999 | Adams ........................ 713/200 |
| 6,031,815 A | * | 2/2000 | Heemskerk ............... 369/275.3 |
| 6,058,085 A | * | 5/2000 | Obata ...................... 369/53.17 |
| 6,091,681 A | * | 7/2000 | Van Den Enden et al. ........................ 369/47.11 |
| 6,131,161 A | * | 10/2000 | Linartz ....................... 713/176 |
| 6,216,228 B1 | * | 4/2001 | Chapman et al. ........... 713/176 |
| 6,252,963 B1 | * | 6/2001 | Rhoads ........................ 380/54 |

* cited by examiner

DATA RECORDING/REPRODUCING APPARATUS, DATA RECORDING/REPRODUCING METHOD APPLIED TO THE APPARATUS, AND COMPUTER PROGRAM PRODUCT USED IN DATA PROCESSING APPARATUS

This a division of application Ser. No. 09/189,844, filed Nov. 12, 1998, all of which are incorporated herein by reference.

BACKGROUND OF THE INVENTION

The present invention relates to a data recording/reproducing apparatus using a DVD (Digital Versatile Disk)-RAM and the like as a record medium, a data recording/reproducing method applied to the apparatus, and a computer program product used in a data processing apparatus. More particularly, the invention relates to a data recording/reproducing apparatus using a single record medium to handle audio/visual data such as DVD video and normal digital data used in a computer.

This application is based on Japanese Patent Applications No. 9-312344 filed on Nov. 13, 1997 and No. 9-329207 filed on Nov. 28, 1997, the contents of which are incorporated herein by reference.

In recent years, with progress of computer and multimedia, various multimedia-capable computer systems have been developed. Function for reproducing animation or sound data in addition to function for reproducing text data or graphic data is provided with such computer.

With such progress in multimedia of the computer, a DVD has lately drawn attention as a new record media taking the place of CD-ROM. One side of a single DVD-ROM media can store data of about 4.7 G bites which is about seven times volume of the current CD-ROM, and both sides of the DVD-ROM media can store data of about 9.4 G bites. By using the DVD-ROM media, it is possible to reproduce animation such as movie including a great amount of picture information on a computer at high quality.

On the other hand, development of a DVD-RAM media which can read out and write in data has also been developed recently. Since the DVD-RAM media is a media having a large volume and capable of being written, the DVD-RAM media is not only used for recording the animation data, but is also greatly expected as a secondary storing device of a computer. Further, the DVD-RAM media has drawn attention as a new record media taking the place of a video cassette in public equipment such as a video camera or video tape player.

Therefore, the DVD-RAM can handle both audio visual data (which is referred to as AV data hereinafter) which regards actual time property as most important, and digital data (which is referred to as D data hereinafter) which regards accuracy as most important such as file data used in the computer.

However, when there is a defective sector during recording into the DVD-RAM media, handling of the defective sector differs between AV data and D data. That is, in the case of AV data which regards actual time property as most important, it is preferable to keep recording even if the fact that data can not be recorded accurately in such a defective sector is ignored. On the other hand, in the case of D data, it is important to rewrite the D data in an alternative sector while regarding the accuracy as most important.

In general, an apparatus for recording/reproducing D data carries out, in recording processing of data, the verifying processing for checking whether the data has been correctly recorded after recording. Further, in reproducing processing of data, retry processing is carried out when a defect is generated. Since the D data is program data or file data made by various kinds of application soft, if a defect is generated, the entire program may not be executed. Therefore, the verifying processing and the retry processing which is performed when a defect is generated are necessary and indispensable since reliability is regarded as most important.

Whereas, the AV data comprises image data or sound data, and it is important that the data is recorded and reproduced without interruption. Even if a defect is generated when the data is recorded or reproduced, this does not make it impossible to reproduce the AV data although a noise is generated in a portion of the picture. Therefore, AV data does not necessarily require the verifying processing or the retry processing.

As described above, a degree of necessity of the verifying processing or the retry processing differs depending upon the kind of data. However, conventionally, the verifying processing is carried out when data is recorded, and the retry processing is carried out when data is produced irrespective of kinds of data. Therefore, regarding a method for recording and reproducing D data, when image data having a great amount of data is recorded, extra time for verifying processing is required. Further, when the image data is reproduced, if the retry processing is carried out, the image which is in reproducing is interrupted for a time during the retrying.

BRIEF SUMMARY OF THE INVENTION

A first object of the present invention is to provide a data recording/reproducing apparatus which determines the kind of data and can execute the recording/reproducing processing in a suitable manner to the kind of data.

A second object of the invention is to provide a data recording/reproducing method applied to the data recording/reproducing apparatus.

A third object of the invention is to provide a computer program produce used in a data processing apparatus.

The above object is achieved by the following data recording and reproducing apparatus. That is, the data recording and reproducing apparatus executes recording and reproducing processing of a record medium in which at least two kinds of data having different data types can be stored. The data recording and reproducing apparatus reads out data from the record medium, detects a digital watermark from the data read out, and determines the kind of data depending upon whether the digital watermark is detected. The data recording and reproducing apparatus determines whether a defect is exists in the read out data, determines whether the retry processing should be carried out for the detected defect in accordance with the determined kind of data, and carries out the retry processing in accordance with a determination result.

In this data recording and reproducing apparatus, when the reading-out processing of two kinds of data or more having different data types is carried out, the kind of data is determined in accordance with whether the digital watermark exists in data, and the retry processing is carried out when a defect is generated in accordance with the kind of data. Therefore, in the case of data whose reading-out continuity is more important than reliability, the retry processing is omitted, and the reading-out processing time can be shortened.

Further, the data recording and reproducing apparatus of the present invention obtains data to be written, detects a digital watermark from the obtained data, determines the kind of data depending upon whether the digital watermark is detected, and writes the obtained data to the record medium. It is determined whether the verifying processing should be executed depending on the determined kind of data, and the verifying processing is executed in accordance with a determination result.

In this data recording and reproducing apparatus, when the reading-out processing of two kinds of data or more having different data types is carried out, the kind of data is determined in accordance with whether the digital watermark exists in data, and the verifying processing is carried out in accordance with the kind of data. Therefore, in the case of data whose recording continuity is more important than reliability, the verifying processing is omitted, and the writing processing time can be shortened.

Further, when a defect is generated in a sector for writing data in the storing area of the record medium and data to be written is determined that the verifying processing should not be executed, the data recording and reproducing apparatus of the invention may skip such a sector where the defect is generated and write the data in the following sector, or may write the data in the sector where the defect is generated.

In this data recording and reproducing apparatus, even if an OS or a file system detects a defect during the writing processing for example, the recording is continued without being interrupted by keeping writing sequentially while skipping the defective sector in accordance with the kind of data, or by keeping writing sequentially irrespective of whether there is a defective sector. In this case, there is a possibility that information in a portion in which a writing is carried out in a defective sector may be lost and may not be normally reproduced later. However, in the case of audio/visual data, if that portion is converted into reproduction time, the time for lost information is extremely short time, and if a known adjusting processing is carried out for that portion to lower the remarkability of the defect, it is possible to lower a degree of the problem to a satisfactory level as long as a man sees and listens to with his eyes and ears.

Further, the data recording/reproducing apparatus of the present invention reads out data from a record medium, and when a defect is detected during the reading-out processing of data, stores the position of the defective sector, and carries out the retry processing for the stored defect position after the reading-out processing of data is completed. The digital watermark may be detected from the data read out, the kind of data may be determined depending upon whether the digital watermark is detected, and it may be determined whether the retry processing for the stored defect position should be executed in accordance with the determined kind of data.

In this data recording and reproducing apparatus, when a defect is detected during the reading-out processing of data, the defect position is stored, and the reading-out processing of data through a specified area, thereby making it possible to reliably check whether a digital watermark exists in the data. Further, by executing the retry processing for the defect position in accordance with the kind of data after the data is read out, it is possible to avoid interruption of reading-out of data whenever a defect is detected, and to shorten the entire processing time.

The second object is achieved by the following data recording and reproducing method applied to a data recording and reproducing apparatus. That is, the data recording and reproducing method of the present invention is applied to a data processing apparatus which reads out a series of data in which a digital watermark is embedded. According to this data reading-out method, even if a defective sector is detected when the series of data is being read out, the retry processing for the defective sector is not executed, and the reading-out of the series of data is completed, the digital watermark is detected from the reading-out series of data, and the kind of data is determined depending upon whether the digital watermark is detected.

According to the data reading-out method, it is determined whether the retry processing for the defect should be executed depending upon the determined kind of data, and when it is determined that the retry processing should not be executed, reading-out of data next to the series of data is continued, and when it is determined that the retry processing should be executed, the retry processing for the detected defective sector is executed.

The third object is achieved by the following computer program product used for the data processing apparatus. That is, the computer program product of the present invention is used for a data processing apparatus which reads and writes at least two kinds of data having different data types, and causes the data processing apparatus to detect a digital watermark from data and to determine the kind of data depending upon whether the digital watermark is detected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be explained below with reference to the drawings.

Figure 1:
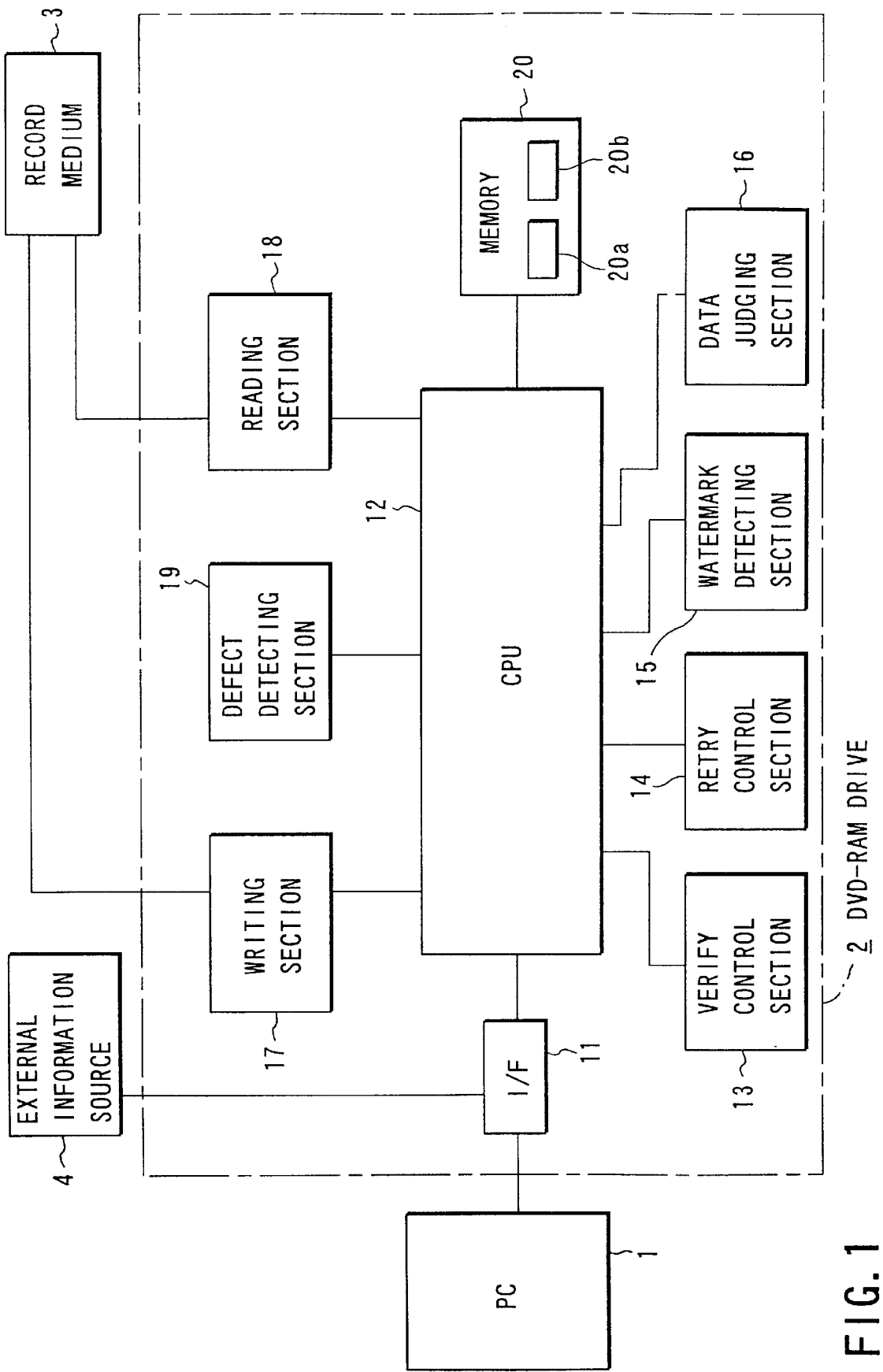
FIG. 1 is a block diagram showing an arrangement of a data recording/reproducing apparatus according to an embodiment of the present invention.

FIG. 1 is a block diagram showing an arrangement of a computer system using a data recording/reproducing apparatus of the present invention. This system comprises a personal computer (which is referred to as PC hereafter) 1, a DVD-RAM drive 2 and a record (storing) medium 3.

The PC1 includes general function of a computer such as making a file using various application programs. The PC1 functions as a higher apparatus than the DVD-RAM drive 2 (data recording/reproducing apparatus), and outputs command of writing-in (storing)/reading-out (reproducing) of data, and outputs data to be written.

The DVD-RAM drive 2 (data recording/reproducing apparatus) records and reproduces at least two kinds of data having different data type. In the present embodiment, the DVD-RAM drive 2 (data recording/reproducing apparatus) stores and reproduces two kinds of data, that is, D data and AV data sent from the PC1.

Here, the D data is program data or file data made by various application programs, and should not include defect. The AV data comprises image data and sound data. Among them, a digital watermark for identifying kinds of data is embedded in the AV data. Embedding process of the digital watermark is carried out by the PC1.

"Digital watermark" is a technique for embedding some information into multi-media data such as image or sound data secretly, which is utilized for protecting a copyright of digital books. In the present embodiment, by utilizing the technique of "digital watermark", digital watermark is embedded in AV data as identification information for identifying kind of data. The present invention is characterized in that recording/reproducing processing suitable for the kind of data is performed by using the embedded digital watermark.

As shown in FIG. 1, the DVD-RAM drive 2 comprises an interface circuit (which will be referred to as I/F hereafter) 11, a CPU 12, a verify control section 13, a retry control section 14, watermark detecting section 15, a data judging section 16, a writing section 17, a reading section 18, a defect detecting section 19 and a memory 20.

The I/F11 inputs and outputs data between the PC1 and an external information source 4. The CPU 12 controls the entire DVD-RAM drive 2 and here, controls writing-in and reading-out of data in accordance with kind of data, that is, D data and AV data.

The verify control section 13 carries out verifying processing at the time of writing data. The verifying processing is a processing for checking whether data has been correctly stored. The retry control section 14 carries out retry processing at the time of reading data. The retry processing is a processing for carrying out reading out again when the defect detecting section 19 detects defect. The watermark detecting section 15 detects the digital watermark. The data judging section 16 determines the kind of data based on the detected result of the watermark by the watermark detecting section 15.

The writing section 17 writes data into the record medium 3. The reading section 18 reads out data from the record medium 3. The defect detecting section 19 detects defect during the writing-in processing and the reading-out processing. The memory 20 stores information necessary for processing of the CPU 12. Here, the memory 20 includes a buffer 20a for temporarily storing D data and AV data obtained from PC 1, and temporarily storing data read out from the record medium 3, and a defect position storing section 20b for storing the defect position detected when data is read out.

The record medium 3 comprises an optical disk. The D data and AV data are stored in this record medium 3. As described above, the digital watermark is embedded in the AV data as identification information for identifying the kind of data.

Next, the operation of the present embodiment will be explained.

Here, the processing for writing the D data and the AV data sent from the PC1 into the record medium 3 by the DVD-RAM drive 2, and the processing for reading out the D data and AV data from the record medium 3 will be explained separately.

(a) Writing Processing of Data

Figure 2:
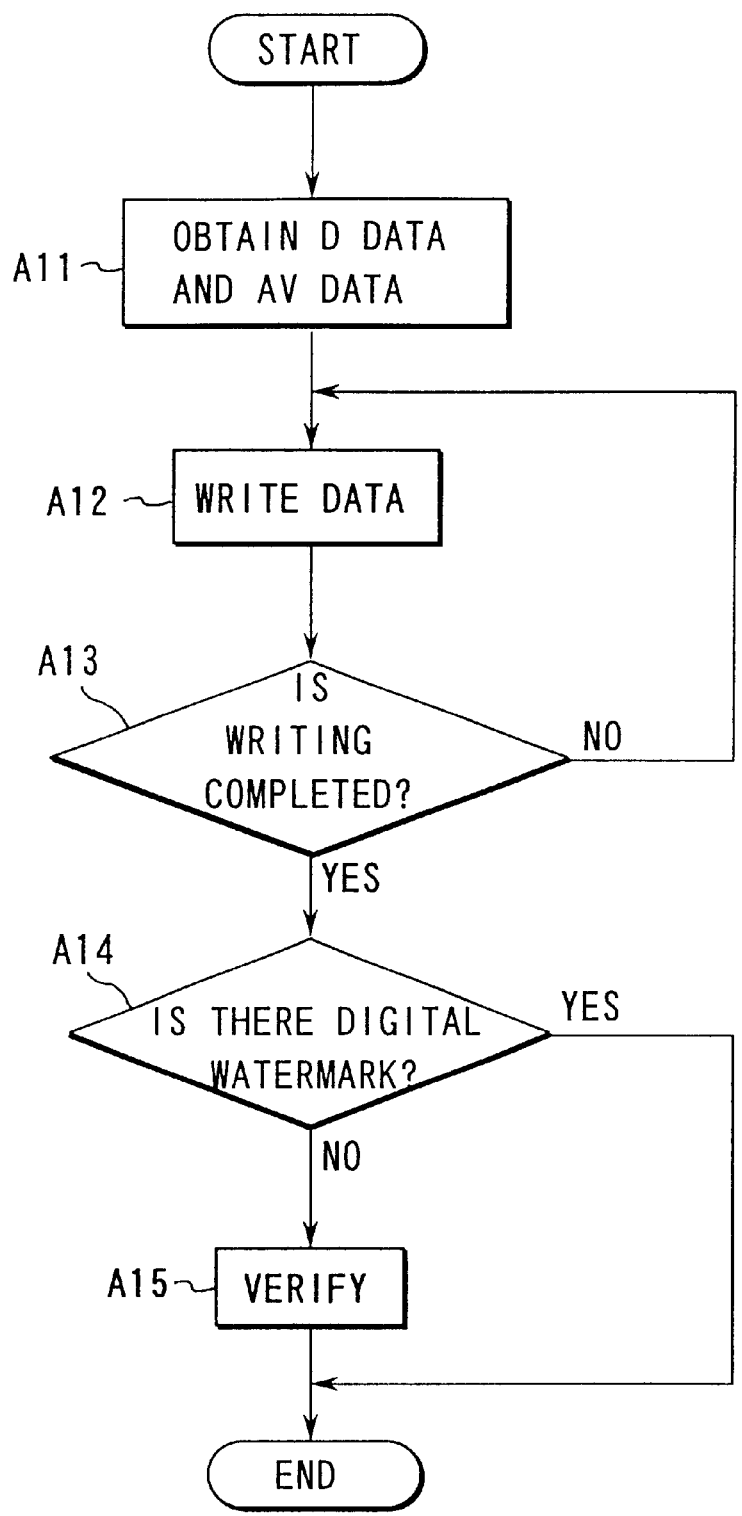
FIG. 2 is a flowchart showing procedure of processing at the time of writing data according to the embodiment.

FIG. 2 is a flowchart showing procedure of processing at the time of writing data according to the embodiment. At the time of writing data, a writing command is output from the PC1 to the DVD-RAM drive 2, and data to be written is output from the PC1.

Here, when the PC1 outputs the AV data, the digital watermark for identifying the kind of data is embedded in the AV data at a plurality of locations thereof.

As a method for embedding the digital watermark, there are a method for embedding the digital watermark by processing the sampling value such as waveform or pixel, and a method for converting the image data and sound data into frequency component and embedding the digital watermark into a specific frequency component. However, the method of the present invention should not be limited to these methods.

First, the DVD-RAM drive 2 inputs data to be written and writing command via the I/F 11 in step A11. Next, in step A12, the data to be written is sequentially stored in the buffer 20a, and the data is written to the record medium 3 by the writing section 17.

In a normal case, after the data is written, a verifying processing for checking whether the data is correctly stored is carried out to enhance the reliability. However, in the present embodiment, the verifying processing at that time is controlled in accordance with the kind of data.

That is, when the data has been written, it is determined Yes in step A13, and in step A14, the CPU 12 checks, through the watermark detecting section 15, whether the digital watermark is embedded in the data which is written in the record medium 3. In this case, the digital watermark is detected while storing the data in the buffer 20a.

The digital watermark can be detected by reversely converting the data which is the processing opposite from the embedding processing.

As a result, when the digital watermark is not embedded in the data, it is determined No in step A14, and such a data is determined to be the D data. The identification processing of the kind of data is carried out in the data judging section 16. In step A15, the CPU 12 carries out the verifying processing for the D data through the verify control section 13. That is, in the case of the D data, it is checked whether the data is correctly recorded regarding the reliability as most important. If the data is not recorded correctly, processing such as rewriting is carried out.

On the other hand, when the digital watermark is embedded in the data, it is determined Yes in step A14, and it is determined that the data is the AV data. In this case, the CPU 12 completes the processing without carrying out the verifying processing for the AV data.

In this manner, it is determined whether the data is the D data or the AV data depending upon whether the digital watermark exists, and the verifying processing is carried out only when the data is the D data. With this feature, the verifying processing is omitted when the data is the AV data which regards continuity as more important than the reliability, so that time required for writing processing can be shortened.

(b) Reading-out Processing of Data

Figure 3:
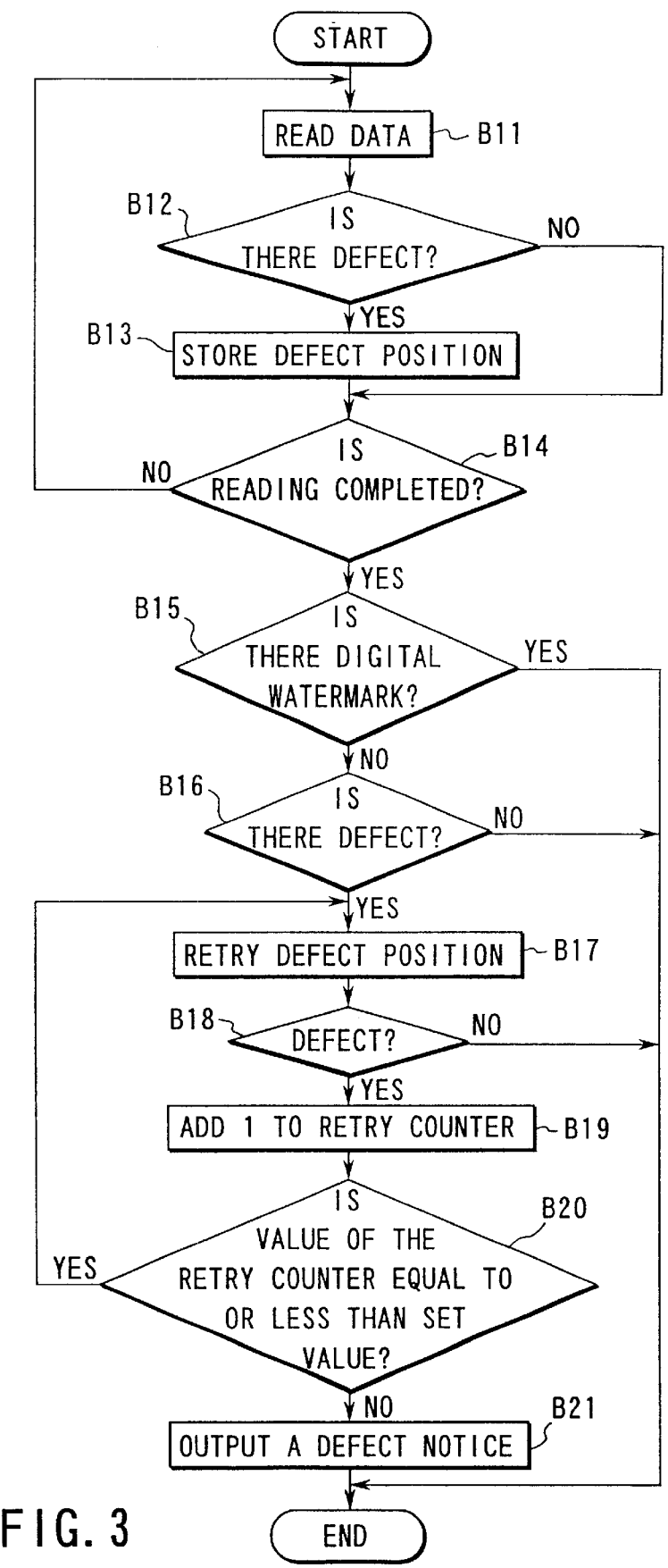
FIG. 3 is a flowchart showing procedure of processing at the time of reading out data according to the embodiment.

FIG. 3 is a flowchart showing procedure of processing at the time of reading data according to the embodiment. At the time of reading data, a reading-out command is output from the PC1 to the DVD-RAM drive 2.

The DVD-RAM drive 2 inputs this reading-out command via the I/F 11 in step B11, thereby reading out data from the record medium 3 through the reading section 18.

In this case, unit of reading-out of the data is set to some sectors for example, and data is read out at unit which is long to some degree, and is sequentially stored in the buffer 20a shown in FIG. 1. This is because that since the DVD-RAM drive 2 does not know which part of the data the digital watermark is embedded in, it is necessary to read out data at unit which is long to some degree and detect the digital watermark.

When a defect is generated in reading out data, retry processing is conventionally carried out with respect to the defect instantly. However, in the present embodiment, the reading out of the data is continued as it is, and after the reading out is completed, the retry processing for the defective portion is carried out in accordance with the kind of data.

That is, if the defect is detected during reading-out of data, it is determined Yes in step B12, and the CPU 12 stores the defect position in the defect position storing section 20b in step B13.

When the reading-out of data is completed, it is determined Yes in step B14. In step B15, the CPU 12 checks, through the watermark detecting section 15, whether the digital watermark is embedded in the data which is read out from the record medium 3. At that time, the digital watermark is detected by the above-described reverse conversion processing.

As a result, if the digital watermark is not embedded in the data, it is determined No in step B15, and the data is determined to be D data. This processing is carried out by the data judging section 16. Then, the CPU 12 refers the defect position storing section 20b to check whether the defect is detected during the reading out. If the defect is detected, it is determined Yes in step B16, and the retry processing for the detect position is carried out in step B17.

That is, in the case of D data, whose reliability is more important, processing such as reading again sectors which have been read out and which include the defect position, e.g., one sector is read out again.

If the defect is not eliminated by this retry processing, it is determined Yes in step B18. Then, in step B19, the CPU 12 add one to a retry counter (not shown) provided therein. If the value of the retry counter is equal to or less than a set value, it is determined Yes in step B20, and the procedure is returned to step B17 where the retry processing is carried out again. If the value of the retry counter exceeds the set value, that is, if the defect is not eliminated though the retry processing is repeated many times, it is determined No in step B20. Then, in step B21, the CPU 12 outputs a defect notice to the PC 1 through the I/F 11, and the processing here is completed.

On the other hand, if the digital watermark is embedded in the data, it is determined Yes in step B15, and the data is determined to be AV data. In this case, the CPU 12 completes the processing without carrying out the retry processing for the AV data irrespective whether or not there is a defect.

In this manner, the data judging section 16 determines whether the data is the D data or the AV data depending upon whether the digital watermark exists, and only when the data is D data, the retry processing for the defect position is carried out. With this feature, the retry processing is omitted when the data is the AV data whose continuity is more important than reliability, so that time required for reading-out processing can be shortened.

Further, for the D data also, the retry processing is not carried out as soon as a defect is detected, but is carried out after reading out of the data is completed, therefore, the processing time can be shortened as compared with the conventional retry method.

Such a retry processing will be explained in more detail with reference to FIG. 4.

Figure 4:
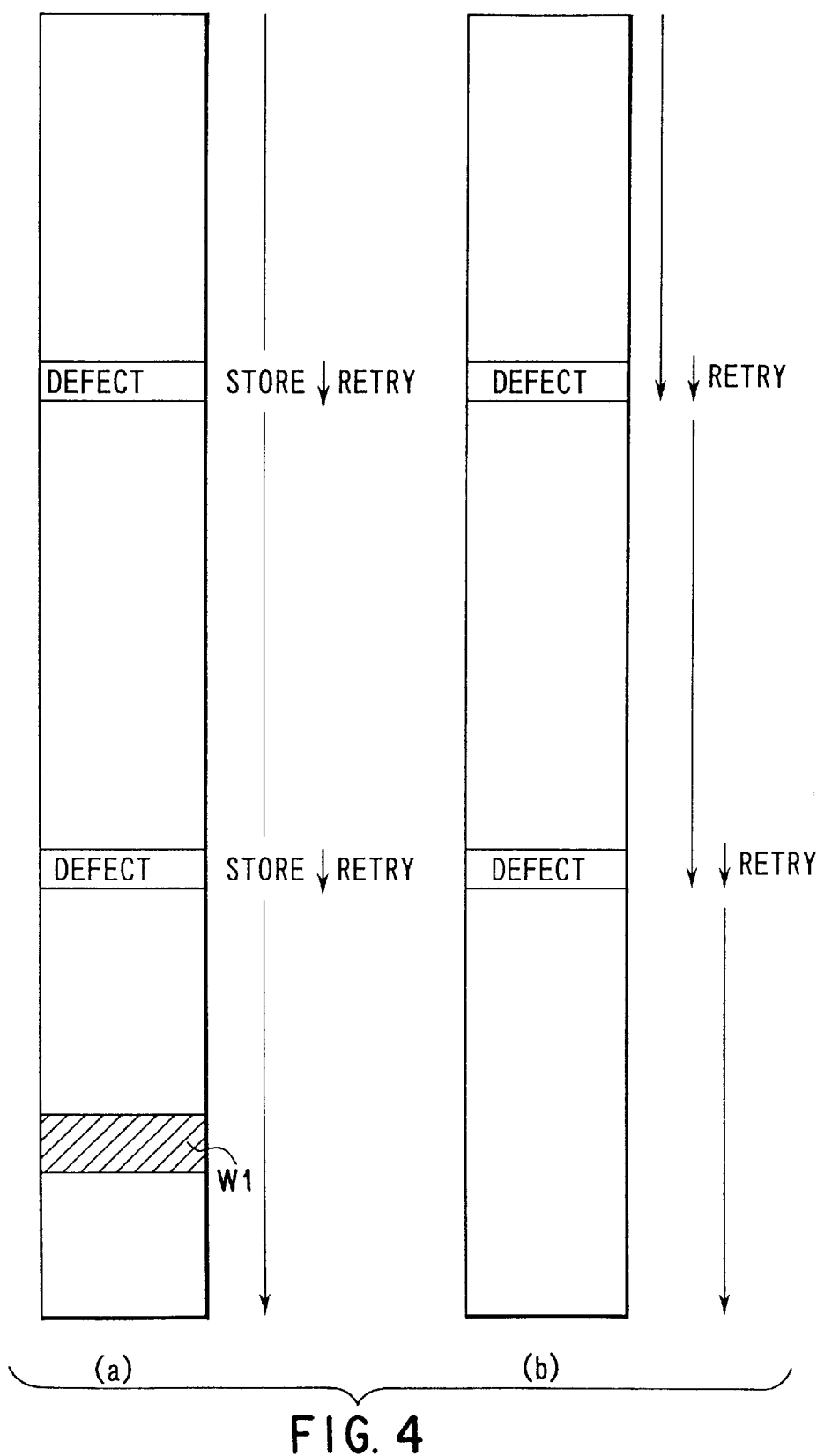
FIG. 4 is diagram for comparing a retry method of the present invention with a conventional reply method.

FIG. 4 is for explaining the retry method of the present invention and the conventional retry method, respectively. In the conventional retry method, as soon as a defect is detected during the reading-out of data, the reading-out of the defect position is retried as shown in FIG. 4. Therefore, whenever a defect is detected, the reading-out of data is interrupted. As a result, not only it takes a long time to read out the data, but also reproducing process of pictures is stopped many times during reproducing if the data is the AV data.

Whereas, in the retry method of the present invention, as shown in FIG. 4, when a defect is detected during the reading-out of data, the defect position is stored, and the reading-out processing is continued as it is. After the reading-out of data is completed, the reading-out of the stored defect position is retried. Therefore, the reading-out of data is not interrupted whenever a defect is detected unlike the conventional method, the entire processing time is shortened correspondingly. Further, in case of the AV data, the retry processing itself is not carried out. Therefore, although the reproduced pictures may become messy a little, there is no inconvenience such as stopping reproducing many times as in the conventional method.

Although the above description with reference to FIG. 4 has been made in view of the retry method, following description will be made, changing its view point, in view of reliably detecting the digital watermark itself.

"Digital watermark" is a technique for appropriately embedding a name of the author or title maker in data, and such information is not necessarily stored in a specific position in the AV data. This is because that the digital watermark may be embedded in only a portion of one image, or may finely be embedded in the entire data.

Therefore, if the digital watermark is embedded in an intermediate portion of the data or is embedded in the series of data entirely, it is not possible to determine whether the digital watermark is embedded unless the data is reproduced to some degree.

For example, if the digital watermark is embedded in the position W1 in FIG. 4, the digital watermark can not be detected when the defect is detected. Further, if the digital watermark is embedded in the entire data, and it is not possible to reliably determine whether the digital watermark is embedded unless 70% of data or more is read out, even if a defect is detected when 40% of data is read out, the digital watermark can not be detected at that time.

However, as in the present invention, even through an inconvenience of reproducing operation such as defect is found, to entirely reproduce the series of data can reliably determine whether the digital watermark exists. Therefore, it is possible to reliably select the control of reading-out processing of data after that.

Although the above embodiment has been explained using the case of the DVD-RAM drive, the present invention should not be limited to the DVD-RAM drive, and the present invention can be applied to any apparatus by which at least two kinds of data having different data type can be recorded and reproduced.

Figure 5:
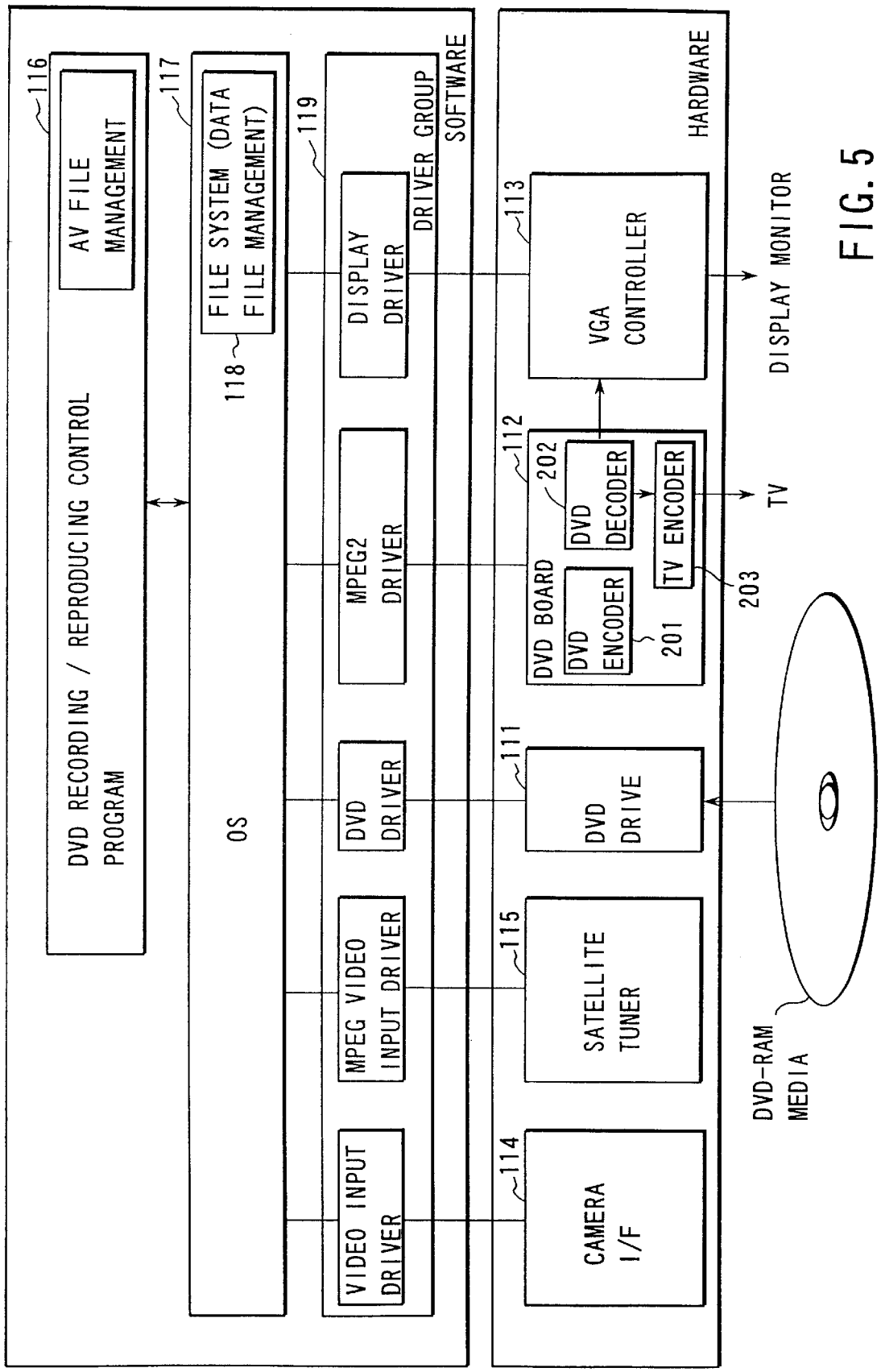
FIG. 5 is a block diagram showing a basic arrangement of hardware and software for realizing the data recording/reproducing apparatus of another embodiment of the present invention.

FIG. 5 shows basic arrangement of hardware and software of data processing apparatus according to another embodiment of the present invention.

This data processing apparatus is realized as a digital video player, a set top box, or a personal computer. Also it includes function to display computer graphics, animation, and the like on an exclusive display monitor or a home TV.

This data processing apparatus comprises, as a main hardware necessary to record and reproduce the AV data and the D data, a DVD drive 111, a DVD board 112, a VGA controller 113, a camera interface 114 and a satellite tuner 115.

The DVD drive 111 is a drive device compatible with DVD-RAM, DVD-ROM and CD-ROM, and optically reads and writes from and to the DVD-RAM media and optically reads out data from the DVD-ROM media and CD-ROM.

The DVD board 112 encodes and decodes the AV data, and is provided with a DVD encoder 201 for encoding and a DVD decoder 202 for decoding.

The DVD decoder 202 is for decoding AV data (video data, sub-picture data and audio data) constituted by MPEG2 program stream which is read out from the DVD-RAM or DVD-ROM. The DVD decoder 202 comprises a system decoder, for separating the video data, sub-picture data and audio data duplexed in the MPEG2 program stream therefrom, a MPEG2 decoder, a sub-picture decoder and an audio decoder, for decoding the separated video data, sub-picture data and audio data, respectively. The sub-picture decoder and the audio decoder carry out decoding processing, corresponding to run-length encoding and Dolby AC3, which are used for encoding the sub-picture data and the audio data respectively.

The DVD encoder 201 encodes the AV data to generate the MPEG2 program stream. The DVD encoder 201 comprises an MPEG2 encoder, a sub-picture encoder and an audio encoder for encoding video data, sub-picture data and audio data, respectively, and a system encoder for duplexing the encoded video data, sub-picture data and audio data.

The DVD board 112 is also provided with a TV encoder 203 for converting the decoded AV data into TV signal of NTSC mode or PAL mode.

The VGA controller 113 is for controlling a display monitor such as LCD or CRT to display the graphic data, stored in an image memory, on the display monitor. The VGA controller 113 is provided with an exclusive video input port for inputting animation data from the DVD board 112. The animation data inputted from the video input port is displayed alone, or is compounded on graphic data stored in the image memory and displayed.

The camera interface 114 takes pictures a taken by an external video camera into a main memory of the data processing apparatus. The above mentioned DVD encoder 201 is also used for encoding the AV data inputted from the external video camera through the camera interface 114. The satellite tuner 115 receives digital TV broadcasting compris-ing MPEG2 stream supplied by the digital broadcasting and takes it into the main memory of the data processing apparatus. The above mentioned DVD decoder 202 is also used for decoding this digital TV broadcasting.

Reproduction of the AV data in the DVD-ROM media, control of recording and reproducing the AV data to and from the DVD-RAM, and editing of the AV data are carried out by a DVD recording/reproducing control program 116. The DVD recording/reproducing control program 116 is an application program running on an OS 117. The DVD recording/reproducing control program 116 controls the recording/reproducing of the AV data, using a part of function of the OS 117 or using various hardware drivers independently prepared for multimedia.

The DVD recording/reproducing control program 116 includes a file management function of the AV data, so that recording processing which takes the continuity of AV data into account is performed. That is, AV data is written in a recording mode which takes into account the actual time property which is necessary for reproducing seamlessly such as writing into continuing physical sectors or continuing the writing processing regardless of whether a defective sector exists or not, under the management of the DVD recording/reproducing control program 116. On the other hand, D data is written in a recording mode which takes into account reliability of recording such as conducting interruption of writing processing, exchanging a defective sector and verifying processing, under the management of the OS 117 or a file system 118.

Next, a concrete system arrangement of the data processing apparatus of the present embodiment will be explained taking the case in which a personal computer is used as a data processing apparatus.

Figure 6:
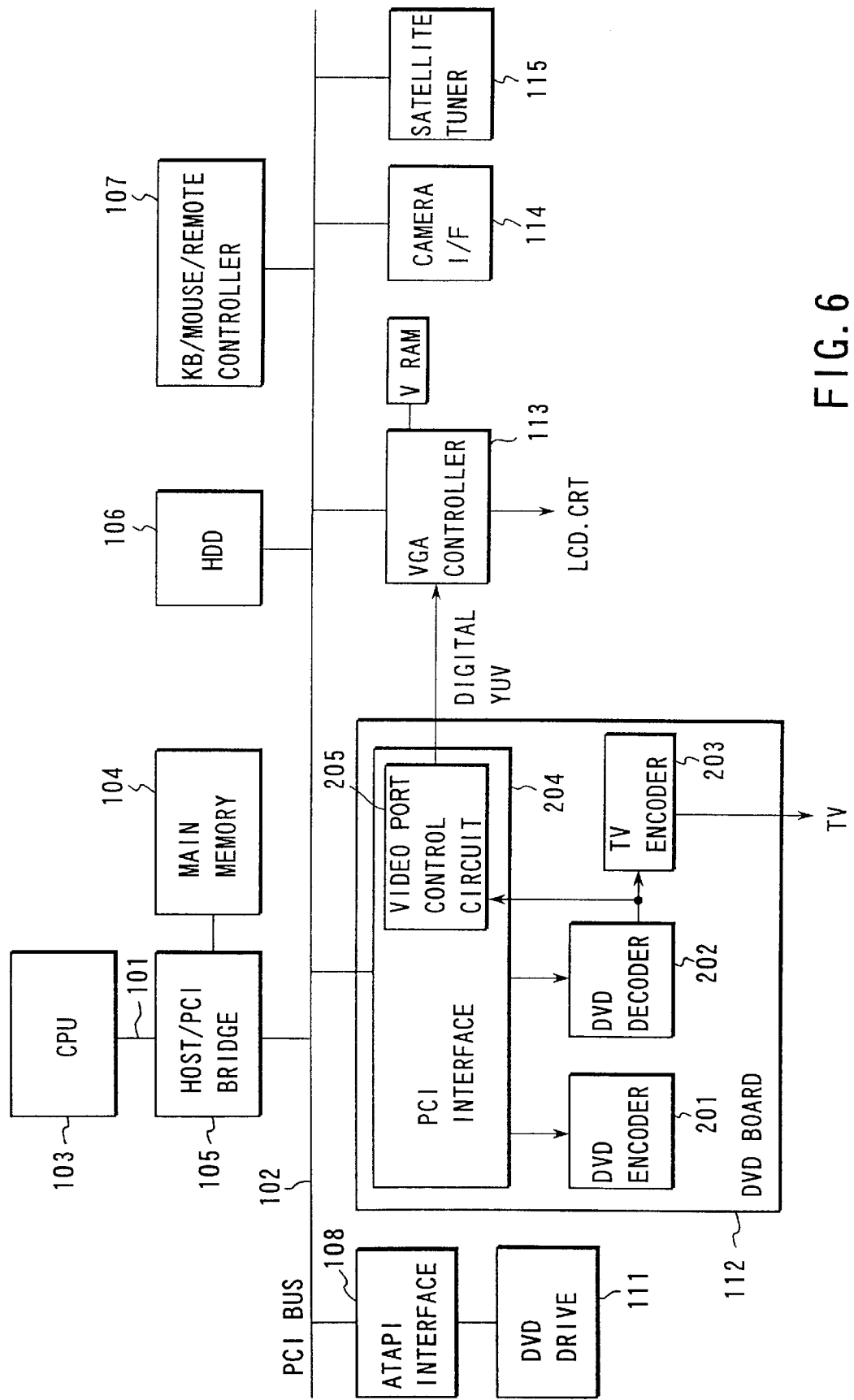
FIG. 6 is a block diagram showing an example of a structure of hardware of the data recording/reproducing apparatus of the other embodiment.

As shown in FIG. 6, this system comprises a host bus (processor bus) 101, a PCI bus 102, a CPU 103, a main memory 104, a host/PCI bridge 105, a HDD 106, an input device 107 such as a key board, a mouse and an infrared remote control, an ATAPI interface 108, the above mentioned DVD drive 111, the DVD board 112, the VGA controller 113, the camera interface 114 and the satellite tuner 115.

The CPU 103 control the operation of the entire system, and executes an operating system stored in the main memory 104 and an application program to be executed. The reproduction of the AV data stored in the DVD-RAM media and the recording of the AV data into the DVD-RAM media are started by making the CPU 103 execute the DVD recording/reproducing control program 116. When the AV data is reproduced, the AV data in the DVD-RAM media is once read out in the main memory 104 and then, sent to the DVD decoder 202 of the DVD board 112. When the AV data is recorded, the AV data inputted from a camera for example, is once read out into the main memory 104 and then sent to the DVD encoder 201 of the DVD board 112, where it is converted into MPEG program stream. This MPEG program stream is stored in the DVD-RAM media while being converted on the main memory 104 into the recording mode of the present embodiment. When TV broadcasting of MPEG program stream is recorded, the DVD encoder 201 is not used, and the AV data of the TV broadcasting is recorded in the DVD-RAM while being converted on the main memory 104 in the recording mode of the present embodiment. When the AV data which has already been recorded in the DVD-RAM media is edited and re-recorded, and the AV data is edited at a simple VOBU unit such as cutting a portion of the AV data, the DVD encoder 201 is not used. On the other hand, in the case of editing to change inside of the VOBU, the DVD encoder 201 is used if necessary.

The DVD board 112 is provided with a PCI interface 204 in addition to the above mentioned DVD encoder 201, the DVD decoder 202 and the TV encoder 203. The PCI interface 204 is provided with a bus master DMA function. Using this function, data can be transmitted between the main memory 104 and the DVD encoder 201 as well as the DVD decoder 202 efficiently. Further, the PCI interface 204 is provided with a video port control circuit 205. The video port control circuit 205 converts digital YUV data, which is output as a decoding result from the DVD decoder 202, into a mode suitable for the interface of the video input port of the VGA controller 113, and transmits the YUV data to the video input port of the VGA controller 113. As a bus for connecting the video input port of the VGA controller 113 and the DVD board 112, VAFC (VESA Advanced Feature Connector) of VESA specification, VM-Channel (VESA Media Channel), S3 LBP interface or ZV port can be utilized. Audio data decoded by the DVD decoder 202 is also sent to an audio controller or line out terminal (both not shown) through an exclusive bus.

The DVD drive 111 reads out stream of AV data stored in the DVD media at a transmission rate of about 10.08 Mbps at the maximum. The DVD drive 111 comprises a DVD media comprising optical disk, a motor, a pickup, a pickup drive, a servo controller, a drive controller including an ECC circuit for detecting and correcting a defect, and the like. The motor, the pickup, the pickup drive, the servo controller and the drive controller drive the DVD media, and function as drive devices for reading-out data stored in the DVD media.

Figure 7:
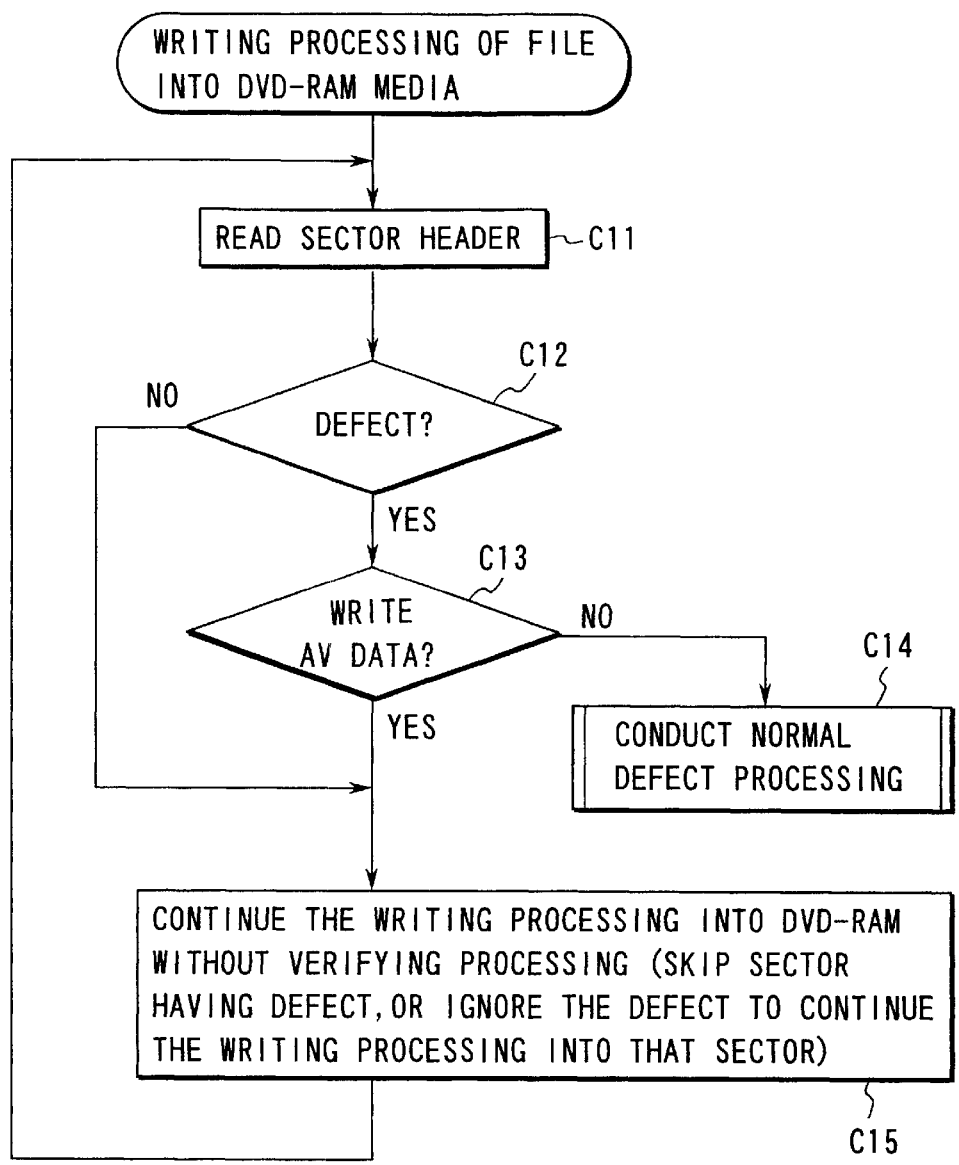
FIG. 7 is a flowchart showing procedure of writing processing of data applied to the data recording/reproducing apparatus of the other embodiment.

Next, writing processing to the DVD-RAM media will be explained with reference to a flowchart shown in FIG. 7.

Writing processing of data to the DVD-RAM media is performed in a unit of a sector as for a normal disc writing processing of data for any of the AV data and the D data. In this writing processing of data in a unit of a sector, a physical sector number of a physical sector where data is written is obtained by the OS 117 or the file system 118, and data is written in that sector. When the AV data is written, data is written sequentially in a series of physical sectors, and when the D data is written, data is written normally in view of position of empty sector.

First, in step C11, sector header is read out. If ID of the sector header can not be read out, generation of defect is detected in step C12. When a defective sector is detected and data which is being written is the D data, it is determined No in step C13, and the writing processing is interrupted and verifying processing is carried out in step C14 as is normally performed. If the file data which is being written is the AV data, it is determined Yes in step C13. Then, in step C15, the DVD recording/reproducing control program 116 is merely informed of generation of a detective sector, and the writing processing is continued. That is, verifying processing is not carried out.

A case in which a defective sector is found and a sector ID of the defective sector, stored in a sector header of the DVD-RAM, can not be read out in writing the AV data, will be explained below with reference to FIG. 8.

Figure 8:
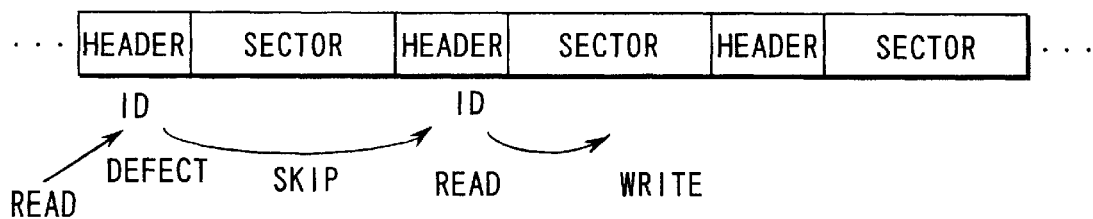
FIG. 8 is a diagram showing writing processing of data into a record medium applied to the data recording/reproducing apparatus of the other embodiment.

In this case, if a condition of seamless reproduction can be satisfied, that defective sector is not used and the defective sector is skipped as shown in FIG. 8. Then, a sector ID stored in a sector header of the following sector is read out, and if the sector ID can be read out, data is written in the sector which follows the skipped sector.

On the other hand, in case that the condition of seamless reproduction can not be satisfied if such a skip processing is carried out, the defect error is ignored, and data is written in the defective sector.

In this continuing processing, a writing to a defective physical sector in which a defect is detected is skipped and a writing to the following physical sector is continued, or a writing to the defective physical sector is carried out ignoring the defect error.

In this manner, processing when a defect is generated differs depending upon whether the data to be written is the AV data or the D data. If the data is the AV data, the writing processing is continued, so that TV broadcasting or video pictures taken by a camera can be written in DVD-RAM in real time. There is a possibility that information in a portion in which a writing is carried out in a defective sector may be lost and may not be normally produced later. However, if entire reproduction time of the AV data is considered, the time for lost information is extremely short time, and if a known adjusting processing is carried out appropriately, there is no problem as long as a man sees and listens to with his eyes and ears.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data recording/reproducing apparatus for recording/reproducing a record medium in which at least two kinds of data having different data types can be stored, comprising:

reading-out means for reading out data from said record medium;

watermark detecting means for detecting a digital watermark from data read out by said reading-out means;

data judging means for determining the kind of data depending upon whether said digital watermark is detected by said watermark detecting means;

defect detecting means for detecting whether a defect exists in data read out by said reading-out means; and retry control means for determining whether retry processing is performed for a defect detected by said defect detecting means in accordance with the kind of data determined by said data judging means, and for executing said retry processing in accordance with a determination result.

2. A data recording/reproducing apparatus for recording and reproducing a record medium in which at least two kinds of data having different data types can be stored, comprising:

data obtaining means for obtaining data to be written;

watermark detecting means for detecting a digital watermark from data obtained by said data obtaining means;

data judging means for determining the kind of data depending upon whether said digital watermark is detected by said watermark detecting means;

writing means for writing the data obtained by said data obtaining means to said record medium; and verifying control means for determining whether write verifying processing is executed in accordance with the kind of data determined by said data judging means, and for executing said write verifying processing in accordance with a determination result.

3. A data recording/reproducing apparatus according to claim 2, wherein said writing means includes means for skipping a sector, where a defect is generated, in a storing area of said record medium and for writing data in the following sector, if the data to be written is determined that said write verifying processing is not executed by said verifying control means.

4. A data recording/reproducing apparatus according to claim 2, wherein
said writing means includes means for writing data in a sector in a storing area of said record medium, even if a defect is generated in the sector, and if the data to be written is determined that said write verifying processing is not executed by said verifying control means.

5. A data recording/reproducing apparatus, comprising:
reading-out means for reading out data from a record medium;
defect position storing means for storing, when a defective sector is detected while data is being read out by said reading-out means, a position of said defective sector; and
retry control means for executing read retry processing for said defect position stored in said defect position storing means after the reading-out of data is completed.

6. A data recording/reproducing apparatus according to claim 5, further comprising:
watermark detecting means for detecting a digital watermark from data read out by said reading-out means; and
data judging means for determining the kind of data depending upon whether said digital watermark is detected by said watermark detecting means;
wherein said retry control means includes means for determining whether the read retry processing for the defect position stored by said defect position storing means should be executed depending upon the kind of data determined by said data judging means.

7. A computer system comprising:
a computer for outputting at least two kinds of data having different data types, and for embedding, in data having specific type, a digital watermark for identifying the kind of data and outputting the data; and
a data recording and reproducing apparatus for inputting said data output from said computer, determining the kind of data depending upon whether said digital watermark exists, and controlling verifying processing at the time of writing data and retrying at the time of reading-out data in accordance with a determination result.

8. A data reading-out method applied to a data processing apparatus which reads out a series of data in which a digital watermark is embedded, comprising the steps of:
completing, even if a defect is detected while said series of data is being read out, reading-out of said series of data without executing retrying for said defect;
detecting said digital watermark from said read-out series of data;
determining the kind of data depending upon whether said digital watermark is detected;
determining whether retry processing for a defect should be executed depending upon the determined kind of data; and
continuing reading-out of data next to said series of data when it is determined that said retry processing should not be executed, and executing said retry processing for said detected defect when it is determined that said retry processing should be executed.

9. A data writing method applied to a data processing apparatus, comprising:
a writing step for writing data to be written in a record medium;
a detecting step for detecting a digital watermark from said data to be written;
a judging step for determining the kind of data depending upon whether said digital watermark is detected; and
a verifying step for determining whether verifying processing should be executed depending upon the kind of data after data is written by said writing step, and executing said verifying processing only for data which is determined to be subjected to said verifying processing,
wherein said writing step includes a sub-step of skipping a sector, where a defect is generated, in a storing area of said record medium and writing data in the following sector, if the data to be written is determined that said verifying processing is not executed by said verifying control means.

10. A data writing method applied to a data processing apparatus, comprising:
a writing step for writing data to be written in a record medium;
a detecting step for detecting a digital watermark from said data to be written;
a judging step for determining the kind of data depending upon whether said digital watermark is detected; and
a verifying step for determining whether verifying processing should be executed depending upon the kind of data after data is written by said writing step, and executing said verifying processing only for data which is determined to be subjected to said verifying processing,
wherein said writing step includes a sub-step of writing data in a sector in a storing area of said record medium, even if a defect is generated in the sector, and if the data to be written is determined that said verifying processing is not executed by said verifying control means.

11. A computer program product comprising:
a computer usable medium having computer-readable code embodied therein for recording/reproducing a record medium in which at least two kinds of data having different data types can be stored;
the computer-readable code comprising:
instructions for reading out data from said record medium;
instructions for detecting a digital watermark from data read out by said reading-out means;
instructions for determining the kind of data depending upon whether said digital watermark is detected by said watermark detecting means;
instructions for detecting whether a defect exists in data read out by said reading-out means; and
instructions for determining whether retry processing is performed for a defect detected by said defect detecting means in accordance with the kind of data determined by said data judging means, and for executing said retry processing in accordance with a determination result.

12. A computer program product comprising:
a computer usable medium having computer-readable code embodied therein for recording and reproducing a record medium in which at least two kinds of data having different data types can be stored;

the computer-readable code comprising:
  instructions for obtaining data to be written;
  instructions for detecting a digital watermark from data obtained by said data obtaining means;
  instructions for determining the kind of data depending upon whether said digital watermark is detected by said watermark detecting means;
  instructions for writing the data obtained by said data obtaining means to said record medium; and
  instructions for determining whether write verifying processing is executed in accordance with the kind of data determined by said data judging means, and for executing said write verifying processing in accordance with a determination result.

13. The computer program product of claim 12, wherein the computer-readable code further comprises:
  instructions for skipping a sector, where a defect is generated, in a storing area of said record medium and for writing data in the following sector, if the data to be written is determined that said write verifying processing is not executed by said verifying control means.

14. The computer program product of claim 12, wherein the computer-readable code further comprises:
  instructions for writing data in a sector in a storing area of said record medium, even if a defect is generated in the sector, and if the data to be written is determined that said write verifying processing is not executed by said verifying control means.

15. A computer program product comprising:
  a computer usable medium having computer-readable code embodied therein for data recording/reproducing;
  the computer-readable code comprising:
    instructions for reading out data from a record medium;
    instructions for storing, when a defective sector is detected while data is being read out by said reading-out means, a position of said defective sector; and
    instructions for executing read retry processing for said defect position stored in said defect position storing means after the reading-out of data is completed.

16. The computer program product of claim 15, wherein the computer-readable code further comprises:
  instructions for detecting a digital watermark from data read out by said reading-out means;
  instructions for determining the kind of data depending upon whether said digital watermark is detected by said watermark detecting means; and
  instructions for determining whether the read retry processing for the defect position stored by said defect position storing means should be executed depending upon the kind of data determined by said data judging means.

* * * * *